(12) United States Patent
Cheng (10) Patent No.: US 6,629,801 B2
(45) Date of Patent: Oct. 7, 2003

(54) POSITION ADJUSTING DEVICE FOR A STROLLER HANDLE

(75) Inventor: Ying-Hsiung Cheng, Tainan Hsien (TW)

(73) Assignee: Pao-Hsien Cheng, Tainan Hsien (TW)

( * ) Notice: Subject to any disclaimer, the term of this patent is extended or adjusted under 35 U.S.C. 154(b) by 0 days.

(21) Appl. No.: 09/981,236

(22) Filed: Oct. 18, 2001

(65) Prior Publication Data

US 2003/0077111 A1 Apr. 24, 2003

(51) Int. Cl.⁷ .................................................. B62B 7/08
(52) U.S. Cl. ........................... 403/101; 403/96; 403/99; 280/642
(58) Field of Search ................................ 403/101, 100, 403/99, 97, 96; 280/642, 650

(56) References Cited

U.S. PATENT DOCUMENTS 5,039,118 A * 8/1991 Huang ...................... 403/96 X
5,123,768 A * 6/1992 Franklin ...................... 403/96
6,216,565 B1 * 4/2001 McCann ................... 403/97 X

* cited by examiner

Primary Examiner—Lynne H. Browne
Assistant Examiner—John Cottingham
(74) Attorney, Agent, or Firm—Rosenberg, Klein & Lee (57) ABSTRACT

A device for adjusting the position of a stroller handle includes two housings each having a first half part and a second half part joined one to the other in angularly displaceable manner. Each housing has disposed therein a toothed disk, and is formed with a control button providing manipulation access thereto. The toothed disks have radial teeth and are each spring biased to concurrently engage teeth formed in the first and second half parts, so as to prevent the second half part from moving relative to the first half part. Each second half part is freed to turn relative to a corresponding first half part when the appropriate control button is actuated to disengage the toothed disk from its first half part. This permits the handle to be adjusted.

4 Claims, 8 Drawing Sheets

POSITION ADJUSTING DEVICE FOR A STROLLER HANDLE

BACKGROUND OF THE INVENTION

The present invention relates to a handle of a stroller, and particularly to one which has a position adjusting device provided between the transverse handled part and a pair of parallel support tube parts thereof.

Many developments have been made in strollers, e.g. foldability and a direction-changeable handle. The foldability allows a stroller to become smaller for easy storage and transportation. And, the direction-changeable handle allows the parent to push the stroller along from the front side of the stroller so as to be able to see the baby in the stroller.

However, no strollers have been provided that have an easy-to-use position adjusting device for transverse handled part of the handle for allowing the user to move the handled part to an appropriate position.

SUMMARY OF THE INVENTION

Therefore, it is a main object of the present invention to provide a position adjusting device for a stroller handle such that the user can adjust the transverse rod part of the handle to an appropriate position.

The position adjusting device of the present invention includes a pair of housings, two toothed disks and two control buttons. The housings each has a first half part and a second half part turnably joined to the first half part. The first half parts are each secured to one of two support tubes of the handle, and each has a disk-shaped portion including a central portion, and several teeth formed on the inner side and pointing to the central portion.

The second half parts are each connected to one of two ends of the transverse handled rod part of the handle, and each has a disk-shaped portion including a central portion, and several teeth formed on the inner side and pointing to the central portion.

The toothed disks are each movably received in one of the housings, and each has several teeth radially formed on a central part. The toothed disks are each biased towards the first half part by a spring to engage the teeth of the first half parts and the teeth of the second half parts at the same time.

The control buttons are each movably fitted to one of the first half parts, and have legs passing into the housings to abut the toothed disks. Thus, the user can push the control buttons to force the toothed disks to move into the second half parts so as to disengage the first half parts for allowing adjusting turning movement of the second half parts relative to the first half parts.

BRIEF DESCRIPTION OF THE DRAWINGS

This invention will be better understood by referring to the accompanying drawings, wherein.

DETAILED DESCRIPTION OF THE PREFFERRED EMBODIMENT

Figure 1:
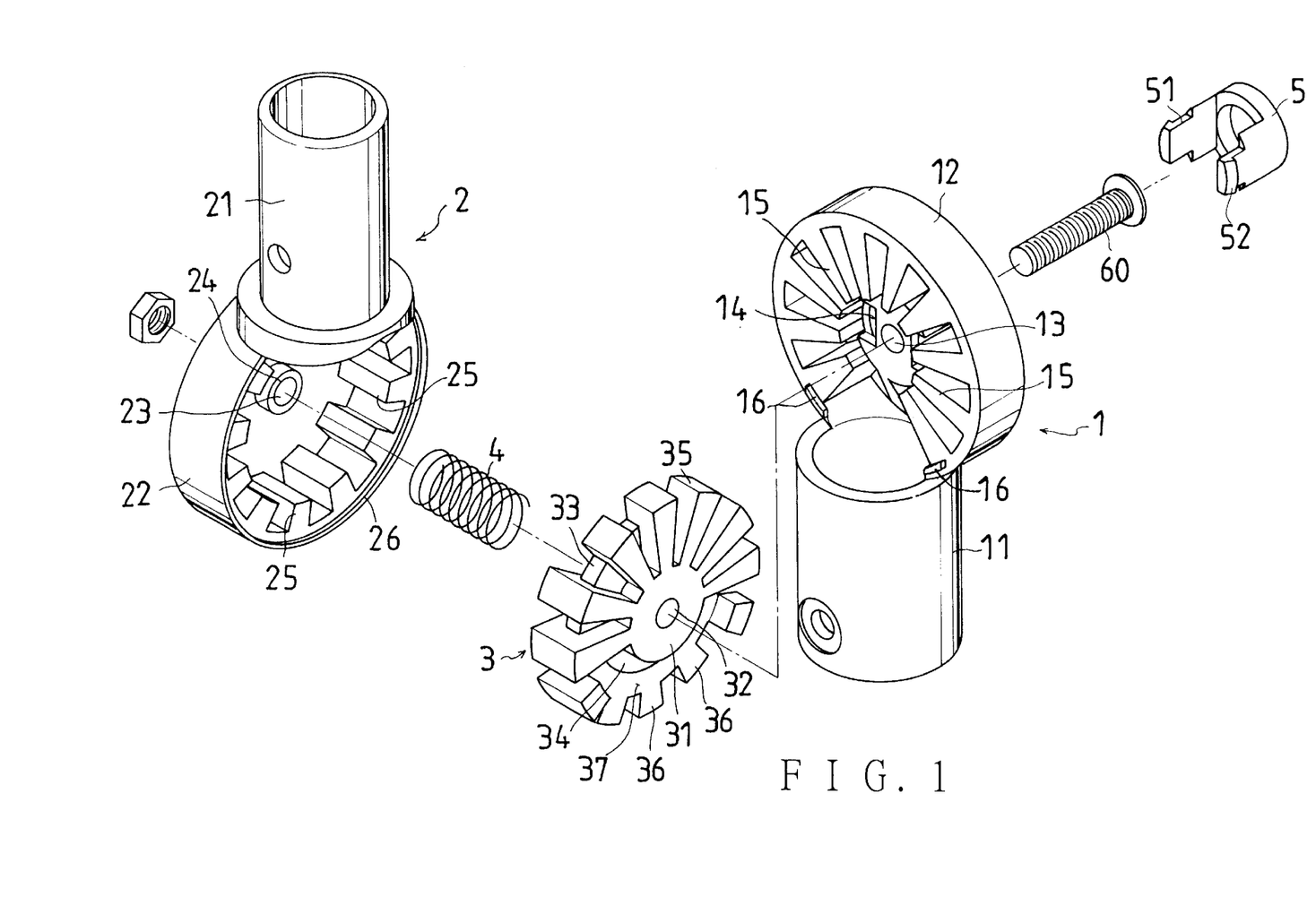
FIG. 1 is an exploded perspective view of the position adjusting device of a stroller handle according to the present invention.
Figure 2:
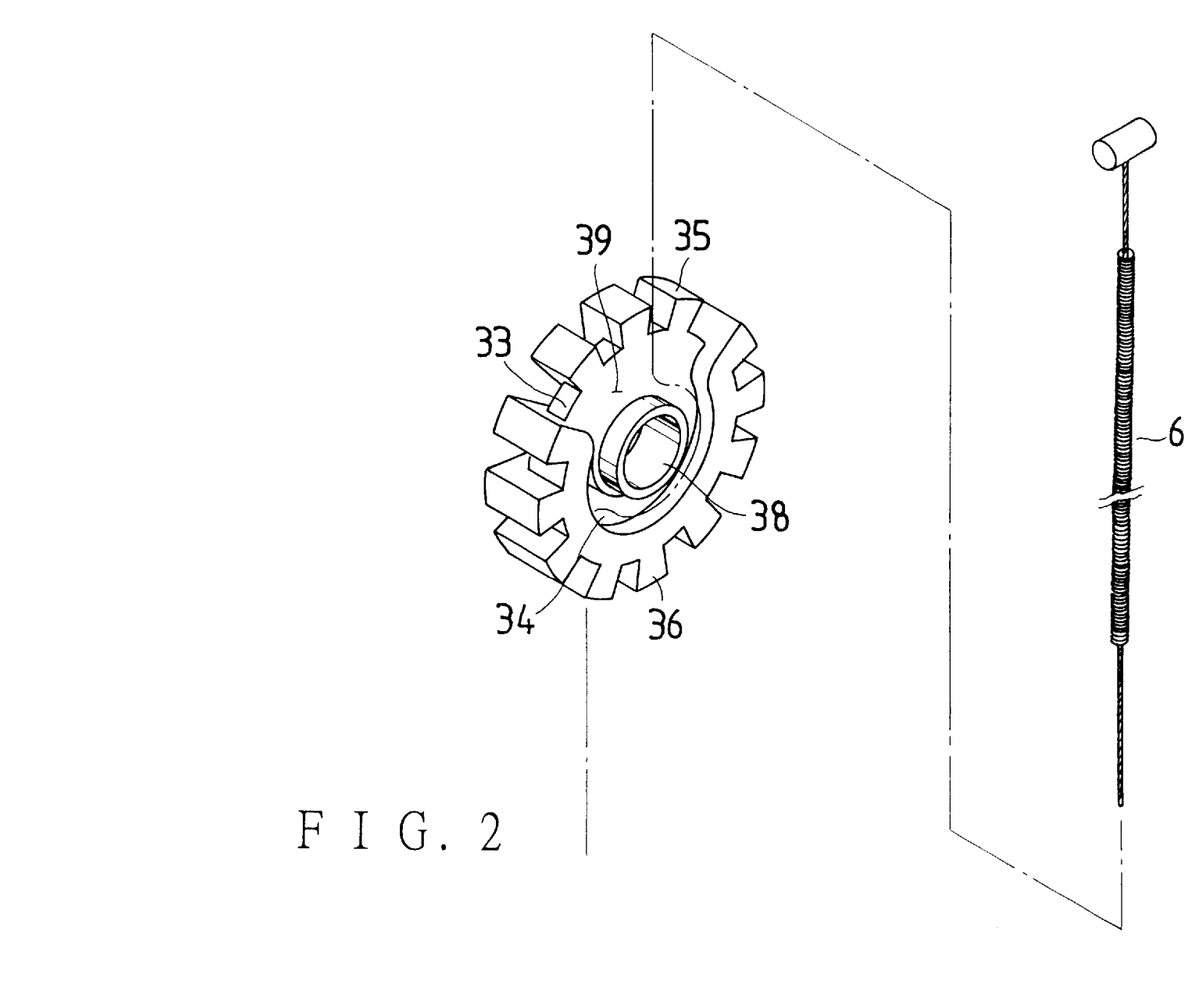
FIG. 2 is another perspective view of the toothed disk in FIG. 1.
Figure 3:
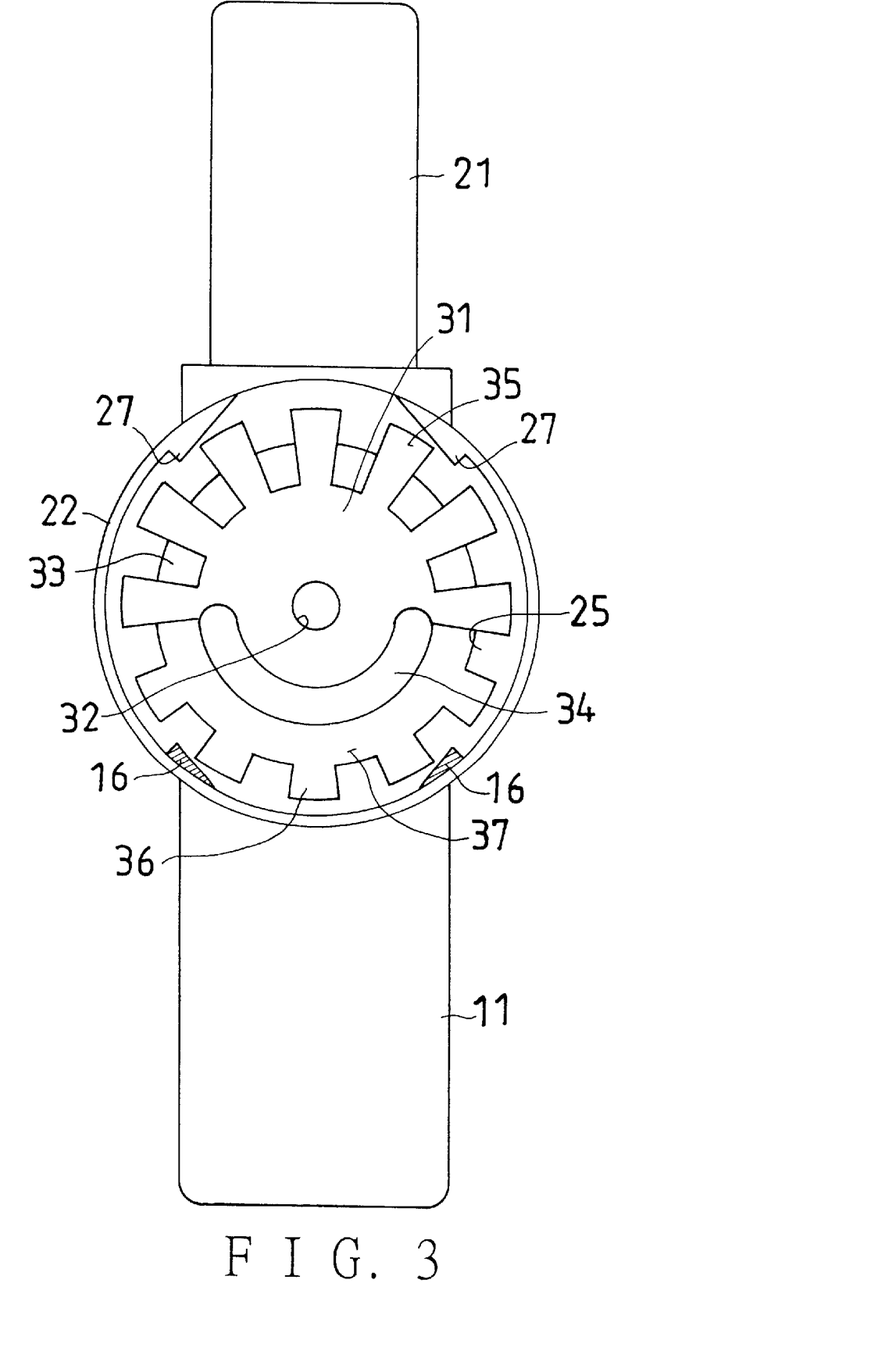
FIG. 3 is a side view of the position adjusting device of FIG. 1.
Figure 4:
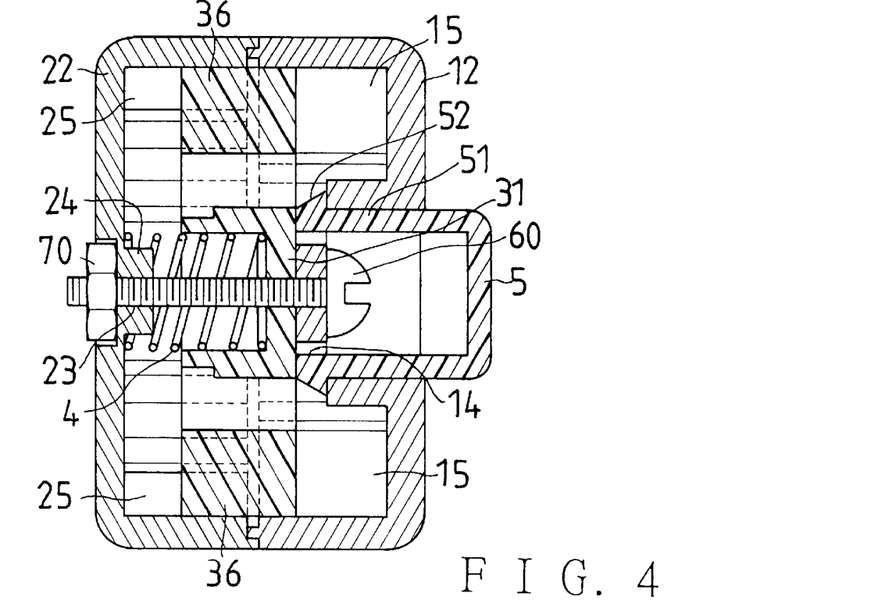
FIG. 4 is a top view of the position adjusting device of FIG. 1.
Figure 5:
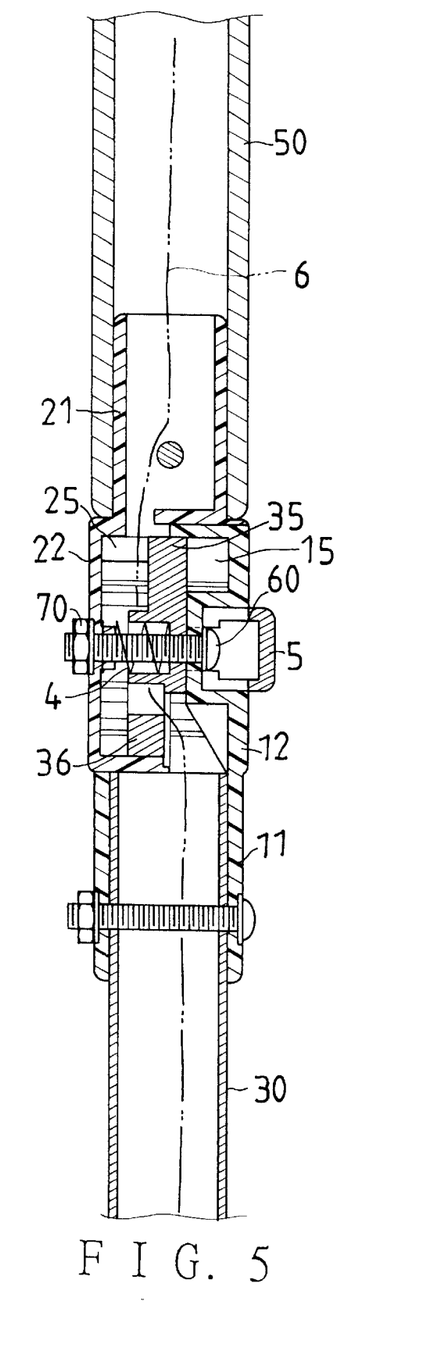
FIG. 5 is a front view of the position adjusting device of FIG. 1.
Figure 6:
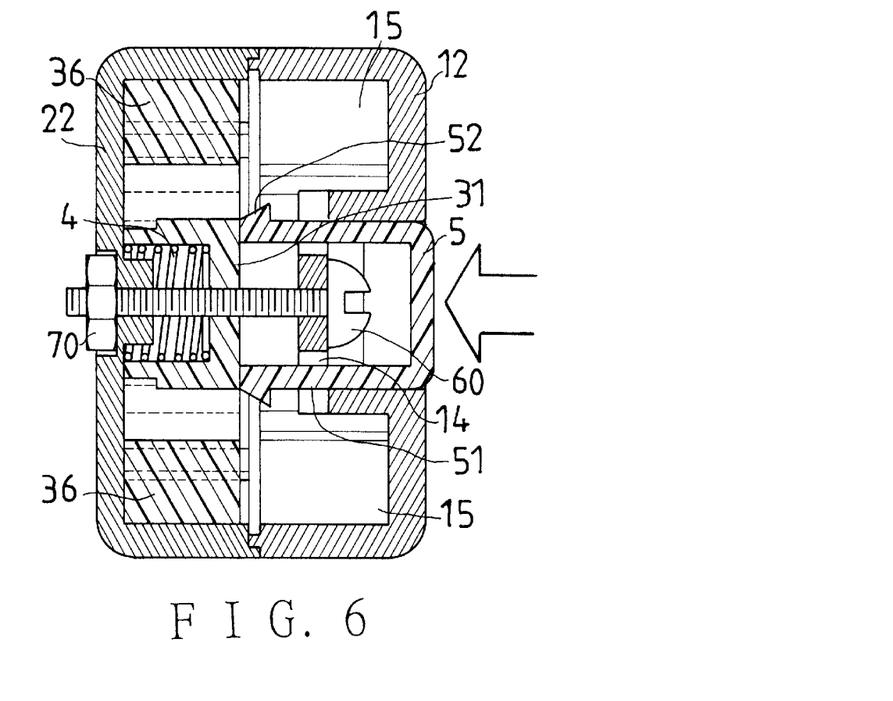
FIG. 6 is a top view of the position adjusting device of FIG. 1 with the control button being pushed for allowing adjustment of the handle.
Figure 7:
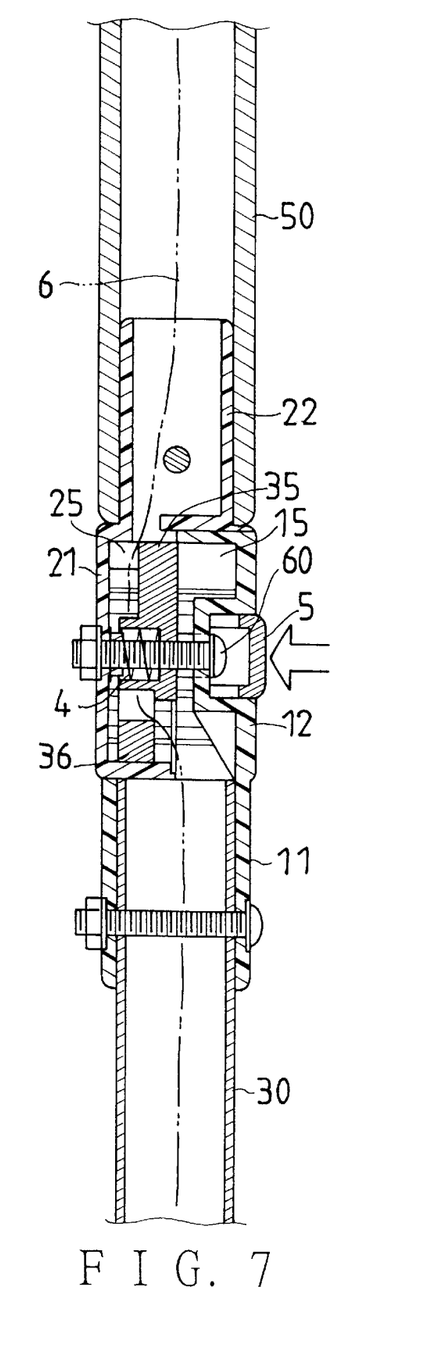
FIG. 7 is a front view of the position adjusting device of FIG. 1, with the control button being pushed for allowing adjustment of the handle.
Figure 8:
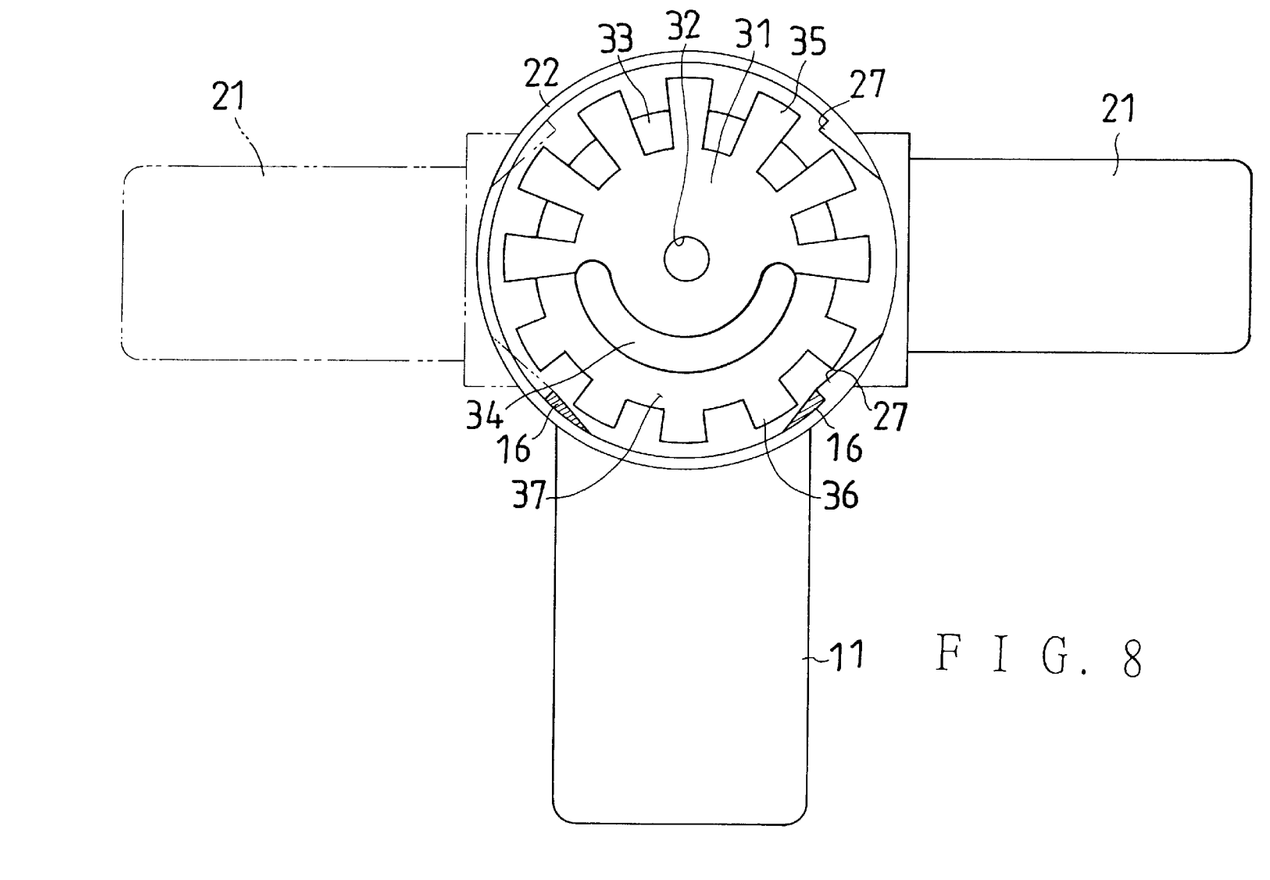
FIG. 8 is a side view of the position adjusting device of a stroller handle in the adjusting movement according to the present invention.
Figure 9:
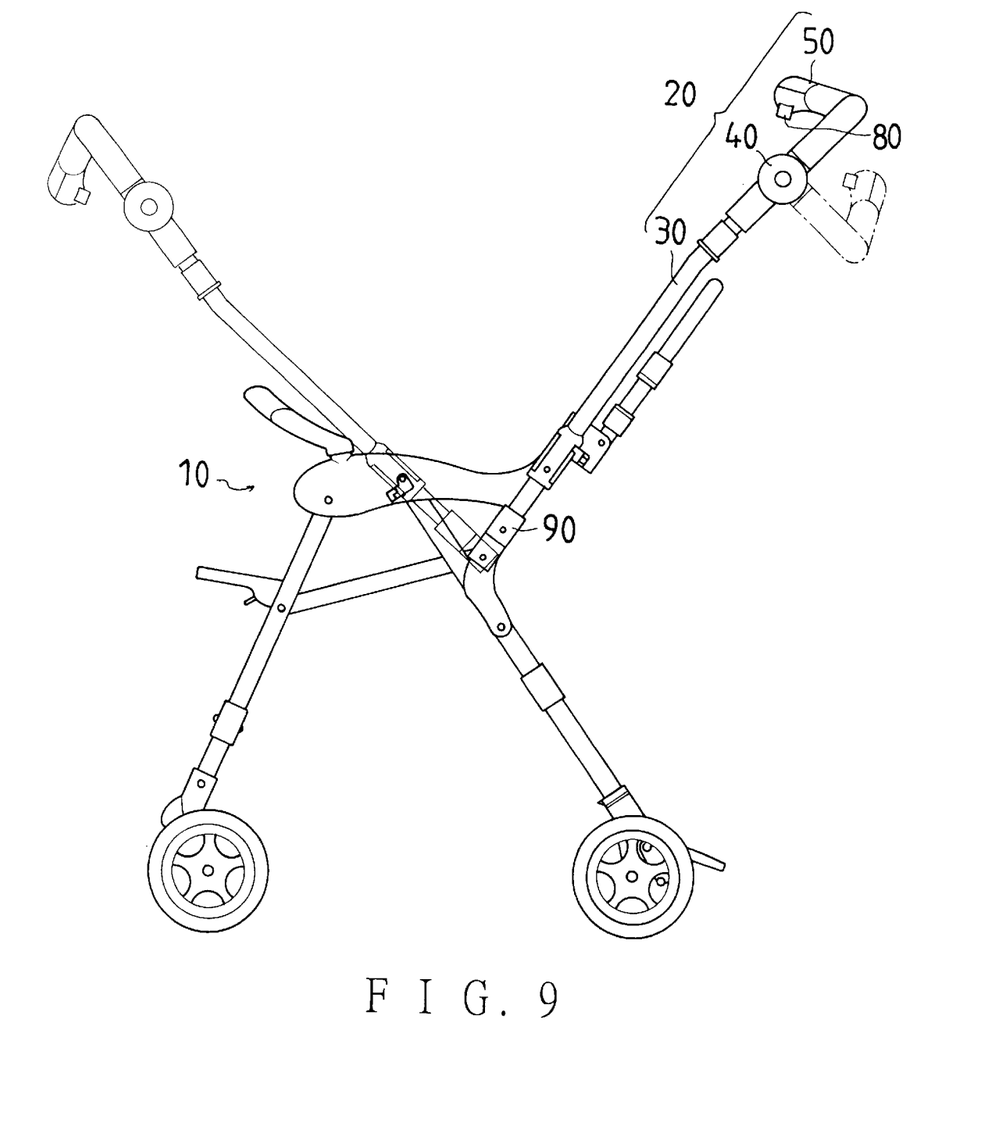
FIG. 9 is a side view of a stroller with the position adjusting device of the present invention, illustrating the movement of the whole handle and the adjustment of the transverse handled rod part.

Referring to FIGS. 1, 2 and 9, a stroller 10 includes a main frame. (not numbered), and a handle 20. The handle includes a pair of support tubes 30, a transverse handled part 50 and a position adjusting device 40, which consists of a pair of housings, two toothed disks 3 and two control buttons 5. The housings each includes a first half part 1, and a second half part 2 turnably joined to the first half part 1 by means of a bolt 60.

Each of the first half parts 1 includes a connecting portion 11, and a disk-shaped portion 12 formed above the connecting portion 11. The connecting portions 11 are each connected to an upper end of one of the support tubes 30. Each of the disk-shaped portions 12 of the first half parts 1 has a central portion and several elongated teeth 15 formed on an inner side to extend toward the central portion. Each of the central portions has a central hole 13 and several through holes 14 formed beside the central hole 13.

The second half parts 2 each includes a connecting portion 21, and a disk-shaped portion 22 formed under the connecting portion 21. The connecting portions 21 are each connected to one of two ends of the transverse handled part 50. The disk-shaped portions 22 each includes a central portion, and several shortened teeth 25 formed on an inner side and pointing to the central portion; a central hole 23 is formed on the central portion, and an annular protrusion 24 is formed around the central hole 23.

The toothed disks 3 are each movably received in one of the housings, and formed with a central part including both an upper platform portion 31 and a lower string receiving recess 37 at one side (FIG. 1), and both an upper string receiving recess 39 and a spring holding cylinder 38 at other side (FIG. 2). A disk-shaped portion 33 is formed on the annular portion of each of the central parts of the toothed disks 3; each of the disk-shaped portions 33 and the corresponding receiving recess 37 are on the same plane.

The toothed-disks 3 each further has elongated teeth 35 radially sticking out from the upper parts of the platform portions 31, and shortened teeth 36 radially sticking out from the string receiving recess 37; referring specifically to FIG. 1, the lateral side of the elongated teeth 35 and the platform portion 31 are on a same plane, while the lateral side of the shortened teeth 36 and the disk-shaped portion 33 are on a same plane. The toothed disks 3 each further has a central hole 32, and a curved slot 34 under the platform portion 31 and on the disk-shaped portion 33. The toothed disks 3 are each biased towards the respective first half parts 1 of the housings by a spring 4, which is positioned between the second half part 2 and the same; the annular protrusion 24 is passed into one end of the spring 4, and the other end of the spring 4 is passed into the holding cylinder 38 of the toothed disk 3.

Strings 6 can be passed through the string receiving recesses 39, the curved slots 34, and positioned in the recesses 37 of the toothed disks 3 such that the same can be connected to a second control button 80 from the upper ends and connected to engaging blocks 90 from the lower ends. The engaging blocks 90 normally engage the main frame of the stroller and can disengage the main frame for permitting the hand support tubes 30 to be moved between a forward position and a rearward position when the second control button 80 is manipulated. Therefore, the strings won't interfere with the turning movement of the second half parts 2 and the toothed disks 3 due to the string receiving recesses 37 and 39. The bolts 60 are passed through the central holes 13, 32 and 23 and connected to a nut 70 so as to combine the first half parts 1, the second half parts 2 and the toothed disks 3.

The control buttons 5 each has several connecting legs 51, which each has hooked ends 52. The connecting legs 51 are passed through the though holes 14 of the first half parts 1 to abut the toothed disks 3 with the hooked ends 52 being capable of engaging the first half parts 1 to prevent the control buttons 5 from falling off the first parts 1. The control buttons 5 each further has a pushed portion outside the first housings 1 for permitting a user to push same to force the toothed disks 3 to completely move into the second half parts 2 so as to disengage the first half parts 1; thus, the second half parts 2 can be moved relative to the first half parts 1, i.e. the transverse handled part 50 can be moved to a desired position with the position adjusting device of the present invention. Therefore, when the handle support tubes 30 are moved to the rear side of the stroller as shown in the right part of FIG. 9, the transverse handled part 50 can be adjusted to a suitable position such as to prevent the user from kicking the rear wheels when she is pushing the stroller along. When the control buttons 5 are released from the pushed position, the spring 4 will bias the toothed disk 3 back to the locking position where the toothed disks 3 engage the elongated teeth 15 and the shortened teeth 25 with teeth 35 and 36 thereof, so as to fix the second half parts 2 from moving.

Figure 10:
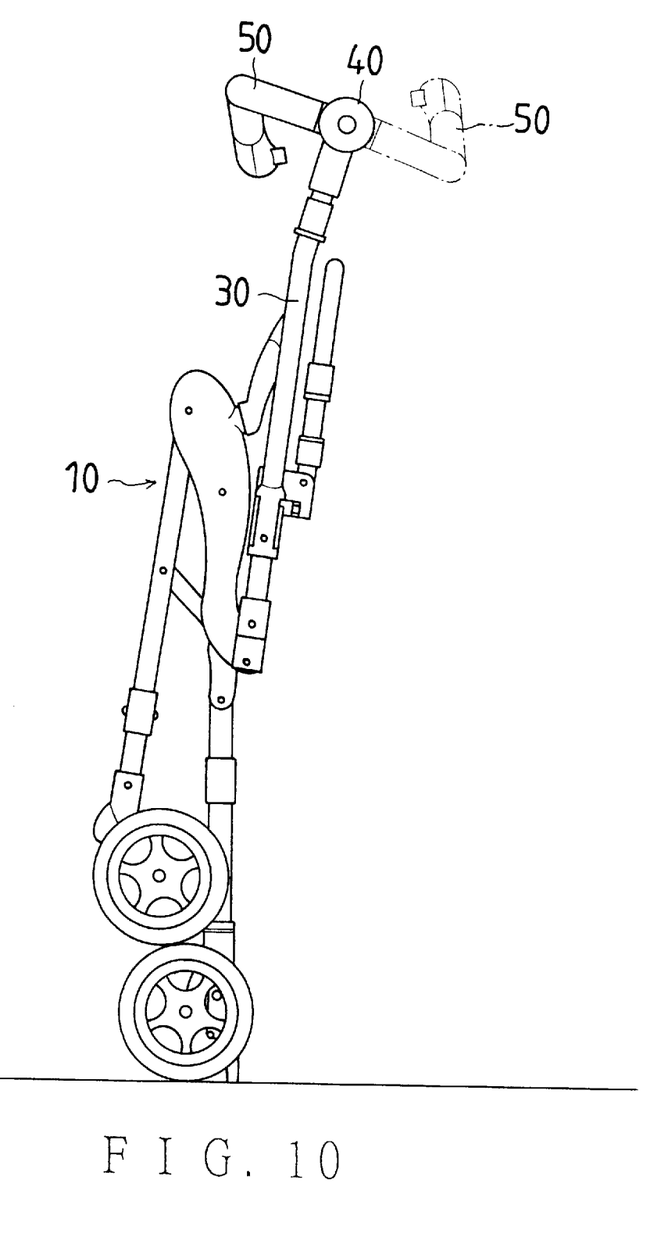
FIG. 10 is a side view of a stroller in a folded position with the position adjusting device of the present invention being manipulated.

Furthermore, referring to FIG. 10, when the stroller is folded to a not-in-use position, the position adjusting device can be manipulated for moving the transverse handled part 50 of the handle to an appropriate position where the same won't cause the folded stroller to need a packing case with bigger dimensions.

The disk-shaped portions 12 of the first half parts 1 each further has two stopping protrusions 16 formed on an edge and facing the second half part 2, while the disk-shaped portions 25 of the second half parts 2 each has an annular guide trench 26 formed on an edge and two stopped protrusions 27 formed on the guide trench 26 such that the stopping protrusions 16 are fitted in the annular guide trenches 26 for the stopped protrusions 27 to get into contact therewith in the adjusting movements thus restricting the turning movement of the second half parts 2.

From the above description, it can be easily understood that the position adjusting device for a stroller handle has the following desirable features:

1. The second half parts can be firmly fixed in the position due to the toothed disks, of which the teeth engage the first half parts as well as the second half parts.

2. When the handle support tubes are moved from a normal rearward position to a frontward position where the parent can see the baby's face while pushing the stroller along, the transverse handled part 50 can be easily adjusted to an appropriate position with the adjusting device.

3. The adjusting device allows the distance between the transverse handled part and the main frame to be increased as shown in FIG. 9, so as to prevent the user from kicking the wheels.

4. When the stroller is folded for transportation, the adjusting device allows the transverse handled part 50 to be moved to a desired position, as shown in FIG. 10, where the handled part won't cause the folded stroller to need a packing case with bigger dimensions.

What is claimed is:

1. A position adjusting device for a stroller handle, comprising a pair of housings; said housings each having a first half part and a second half part joined in angularly displaceable manner to said first half part;

said first half parts being each secured to an upper end of one of two support tubes of said stroller handle; said first half parts each having a central portion, and a plurality of teeth formed on an inner side and pointing to said central portion; said central portions each having a central hole and a plurality of through holes beside said central hole; said second half parts being each connected to one of two ends of a transverse handled part of said handle; said second half parts each having a disk-shaped portion including a central portion and a plurality of teeth formed on an inner side and pointing to said central portion thereof; said central portions of said second half parts each having a central hole;

two toothed disks each movably received in one of said housings; said toothed disks each having a plurality of teeth radially formed on a central part, and a slot at a lower part of said central part; said toothed disks being each spring-biased towards one said first half part to concurrently engage said teeth of said first half part and said teeth of said second half part, at least one of said toothed disks having an intermediate disk shaped portion extending between at least one adjacent pair of said teeth in axially recessed manner relative to a first side of said central part and in substantially coplanar manner relative to an opposed second side of said central part;

two control buttons each having connecting legs passing through said through holes to abut said toothed disk; said control buttons each having a push portion outside said first housing, whereby said toothed disks are moved responsive to user actuation of said push portions into said second half parts so as to disengage said first half parts for allowing position-adjustment turning movement of said second half parts relative to said first half parts.

2. A position adjusting device for a stroller handle comprising:

a pair of housings; said housings each having a first half part and a second half part joined in angularly displaceable manner to said first half part; said first half parts being each secured to an upper end of one of two support tubes of said stroller handle; said first half parts each having a central portion, and a plurality of teeth formed on an inner side and pointing to said central portion; said central portions each having a central hole and a plurality of through holes beside said central hole; said second half parts being each connected to one of two ends of a transverse handled part of said handle; said second half parts each having a disk-shaped portion including a central portion and a plurality of teeth formed on an inner side and pointing to said central portion thereof; said central portions of said second half parts each having a central hole;

said first half parts each have two stopping protrusions formed on an edge and facing said second half part, said second half parts each having an annular guide trench formed at an edge and two stopped protrusions formed on said annular guide trench; said stopping protrusions engaging said annular guide trenches for movement therealong, said stopped protrusions being disposed to limit the movement of said stopping protrusions to thereby restrict turning movement of said second half parts;

two toothed disks each movably received in one of said housings; said toothed disks each having a plurality of teeth radially formed on a central part, and a slot at a lower part of said central part; said toothed disks being each spring-biased towards one said first half part to concurrently engage said teeth of said first half part and said teeth of said second half part; and, two control buttons each having connecting legs passing through said through holes to abut said toothed disk; said control buttons each having a push portion outside said first housing, whereby said toothed disks are moved responsive to user actuation of said push portions into said second half parts so as to disengage said first half parts for allowing position-adjustment turning movement of said second half parts relative to said first half parts.

3. The position adjusting device for a stroller handle as claimed in claim 1, wherein said connecting legs of said control buttons each has a hooked end to engage said first half parts for preventing said control buttons from falling off said first half parts.

4. A position adjusting device for a stroller handle, comprising a pair of housings; said housings each having a first half part and a second half part joined in angularly displaceable manner to said first half part;

said first half parts being each secured to an upper end of one of two support tubes of said stroller handle; said first half parts each having a central portion, and a plurality of teeth formed on an inner side and pointing to said central portion; said central portions each having a central hole and a plurality of through holes beside said central hole; said second half parts being each connected to one of two ends of a transverse handled part of said handle; said second half parts each having a disk-shaped portion including a central portion and a plurality of teeth formed on an inner side and pointing to said central portion thereof; said central portions of said second half parts each having a central hole;

two toothed disks each movably received in one of said housings; said toothed disks each having a plurality of teeth radially formed on a central part, and a slot at a lower part of said central part; said toothed disks being each spring-biased towards one said first half part to concurrently engage said teeth of said first half part and said teeth of said second half part, at least one of said toothed disks having formed in at least one of two axially opposed sides thereof a string receiving recess extending at least partially about said central part, said string receiving recess communicating with said slot receiving a string member passed therethrough; and, two control buttons each having connecting legs passing through said through holes to abut said toothed disk; said control buttons each having a push portion outside said first housing, whereby said toothed disks are moved responsive to user actuation of said push portions into said second half parts so as to disengage said first half parts for allowing position-adjustment turning movement of said second half parts relative to said first half parts.

* * * * *